US006811147B2

(12) United States Patent
Lau et al.

(10) Patent No.: US 6,811,147 B2
(45) Date of Patent: Nov. 2, 2004

(54) STRUCTURED RANDOM PACKING FOR COLUMN

(75) Inventors: Philip Y. Lau, Houston, TX (US); Marv. A. Honnell, Hayden Lake, ID (US)

(73) Assignee: Apollo Separation Technologies, Inc., Houston, TX (US)

( * ) Notice: Subject to any disclaimer, the term of this patent is extended or adjusted under 35 U.S.C. 154(b) by 82 days.

(21) Appl. No.: 10/231,500

(22) Filed: Aug. 30, 2002

(65) Prior Publication Data

US 2004/0041284 A1 Mar. 4, 2004

(51) Int. Cl.$^7$ ................................................ B01F 3/04
(52) U.S. Cl. ........................ 261/95; 261/DIG. 72; 96/290
(58) Field of Search .................. 261/94, 95, DIG. 72; 95/211, 212; 96/290, 299

(56) References Cited

U.S. PATENT DOCUMENTS

| | | | | |
|---|---|---|---|---|
| D232,236 S | * | 7/1974 | La Borde | D23/209 |
| D232,237 S | * | 7/1974 | La Borde | D23/209 |
| 3,823,924 A | * | 7/1974 | Hoon, Jr. | 261/94 |
| 3,924,807 A | | 12/1975 | Morgan | |
| D243,531 S | * | 3/1977 | Strigle, Jr. | D23/209 |
| 4,200,532 A | | 4/1980 | Iwatani et al. | |
| 4,203,935 A | * | 5/1980 | Hackenjos | 261/98 |
| 4,719,090 A | * | 1/1988 | Masaki | 422/310 |
| 4,985,182 A | * | 1/1991 | Basse et al. | 261/94 |
| 5,188,772 A | * | 2/1993 | Yu | 261/94 |
| 5,637,263 A | * | 6/1997 | Lang et al. | 261/94 |
| 5,690,819 A | * | 11/1997 | Chianh | 210/150 |
| 5,901,575 A | * | 5/1999 | Sunder | 62/643 |
| 6,631,890 B1 | * | 10/2003 | Lau | 261/94 |

FOREIGN PATENT DOCUMENTS

| | | |
|---|---|---|
| SU | 441 028 | 12/1974 |
| WO | WO 93/05876 | 4/1993 |

* cited by examiner

*Primary Examiner*—Scott Bushey
(74) *Attorney, Agent, or Firm*—John R Casperson

(57) ABSTRACT

A packing assembly for a column comprises a cage element which carried a packing element. The packing element comprises a first plurality of parallel plates and a second plurality of parallel plates. The first plurality of parallel plates have peripheries which enable them to be accommodated within a sphere. The second plurality of parallel plates interconnect the first plurality of parallel plates and are positioned normally to the first plurality of parallel plates. The second plurality of parallel plates have peripheries which enable them to also be accommodated within the sphere. The packing element is housed in a spherical cage element which possesses a crush strength sufficient to withstand crushing forces to be encountered when the packing assembly is deployed in a column. The packing element self-orients in the column during use to reduce pressure drop and improve performance during the course of operations.

13 Claims, 4 Drawing Sheets

STRUCTURED RANDOM PACKING FOR COLUMN

BACKGROUND OF THE INVENTION

In one aspect, this invention relates to random or dumped packings. In another aspect, this invention relates to a method of making such packings. In a further aspect, this invention relates to a column containing such packings. In a still further aspect, this invention relates to the use of a column containing such packings.

Column packings such as are used in the chemical and petrochemical industries are generally divided into three classes, namely a) Random or Dumped Packings:
   These are discrete pieces of packing of a specific geometrical shape, which are dumped or randomly packed into the column shell.
b) Structured or Systematically Arranged Packings:
   These are crimped layers of wire mesh or corrugated sheets. Sections of these packings are stacked in the column.
c) Grids:
   These are also systematically arranged packings, but instead of wire-mesh or corrugated sheets, these grid-packings use an open-lattice structure.

The field of this invention is random or dump packings. For this application, the earliest engineers used tree barks and round-shape pebbles as dump packing materials for their chemical processing industries (CPI). There are three generations of evolution in random packings:

The first generation of random packing saw use from 1907 to the 1950s. Two basic simple shapes were widely used; namely the Raschig® ring (first patented by Dr. Raschig in Germany in 1907) and the Berl® saddle that became the ancestors of modern random packings. These packings have all been superseded by today's modern packings, and are seldom used in today's CPI.

The second generation of random packings were developed from the late 1950's to the early 1970's. During this period, there were two popular geometrical shapes, namely the Pall® ring, which evolved from the Raschig® ring, and the Intalox® saddle, which evolved from the Berl saddle. The second generation packings are still popular and extensively used in modern CPI today.

The third generation random packings have seen use since the mid 1970's. Third generation packing has produced a multitude of popular geometries, most of which evolved from the Pall® ring and Intalox® saddle, both in metallic and in plastic materials. Popular brand names are as follows: Intalox® Metal Tower Packing (IMTP®), marketed by Norton Company, Cascade® Mini-Rings (CMR® and CMR® Turbo, both marketed by Glitsch, Inc., Chempak® or Levapak (LVK® available in metal from Nuttering Engineering Corporation and in plastic and other nonmetals from Chemetics International, Nutter Rings®, available in metal and plastic, marketed by Nutter Engineering Corporation, HcKp®, marketed by Koch Engineering Company, Inc., Fleximax®, available in metal from Koch Engineering Company, Inc., Hiflow® ring, available in metal, plastic and ceramics from Rauschert Industries, Inc., Jaeger Tri-Packs®, available in metal as Metal Jaeger Top-Pak® and plastic as Hackette® from Jaeger Products, Inc., NOR PAC® (NSW) rings, available in plastic from Nutter Engineering Corporation and from Jaeger Products, Inc., Intalox® Snowflake® packing, available in plastic from Norton Company, LANPAC®, available in plastic from Lantec Products, Inc., IMPAC®, available in metal and plastic from Lantec Product, Inc., VSP®, available from Jaeger Products, Inc., and Interpack®, available from Jaeger Products, Inc., Others packings, for example Tellerette®, Maspac®, Dinpak®, SuperTorus® Saddle, Hiflow® Saddle, Ralu® Ring, ENVIPAC®, Super Levapak (S-LVK®) etc. are also widely used in modern CPI.

One of the leading challenges for improving the known art of random packings is to increase in the total available surface areas of the packing materials.

By increasing the surface area of packings, more liquid loading (in terms of gallons per minute per square feet) can be achieved, which in return can improve the reaction efficiency at the wetting surface of a gas stream and a liquid stream, as in the example of a toxic gas scrubber process, or for liquid feed streams in a distillation column operation.

Raschig rings, which started the age for first generation of random packings, are much more consistent and provide more predictable end results than tree barks and pebble stones. With increases in surface areas, then came the Bert Saddle packings, which outperform the Raschig rings in fluid flow hydrodynamics and performance efficiencies.

Up until the early 1970s, the second generation random packings came with significant efficiency improvement over the earlier first generation packings, simply by changing the geometrical shape of both the Raschig ring and Berl saddle to provide an increase in surface area over the previous ones. The two main representatives of the second-generation random packings are the Pall® ring and the Super Intalox® saddle.

The third generation random packings approximately started from early 1970s till today. The CPI saw a stream of constant newer random packings being introduced on yearly basis. Every time a new random packing enters the market stage, we see a clear sign that each entry of this newer random packing has tried to outdo its competitors by introducing a more intricate network of ribs, rods, struts and pointed fingers, mostly all cross-linked and uniformly spaced throughout the open-structural framework, with the ultimate goal of increasing in the surface area of the random packing, thus increase in performance and efficiency.

On the other hand, there is a common "dark" side in many of today's third generation random packings. In order to increase the surface area, the packing materials become more complex in geometrical shapes, resulting in more individual breakage, less structural rigidity, and more interlocking inside a CPI column. The dilemma facing today's random packings is how to significantly increase the surface area without sacrificing the structural integrity of the individual random packing.

No matter how smart a design engineer, carving out more space to produce more surface area from a solid spherical or cylindrical material like metals or plastics will always weaken structural integrity. The more complex the geometrical shapes, the more surface area and the damage to the structural integrity of the random packings.

It is an object of this invention to provide higher surface area for a column packing without loss of integrity.

SUMMARY OF THE INVENTION

In one embodiment of the invention, there is provided a packing element for a column. The element comprises a first plurality of parallel plates and a second plurality of parallel plates. The first plurality of parallel plates have peripheries which enable them to be accommodated within a sphere. The second plurality of parallel plates interconnect the first plurality of parallel plates and are positioned normally to the first plurality of parallel plates. The second plurality of parallel plates have peripheries which enable them to also be accommodated within the sphere.

Preferably, the packing element is housed in a cage element to form a packing assembly. The cage possesses a crush strength sufficient to withstand crushing forces to be encountered when the packing assembly is deployed in a column. The packing element is positioned in the cage element to provide the packing assembly with more than half of its surface area. The cage protects the packing element.

In use, a multiplicity of the packing assemblies are positioned in a chemical process column having an upper end and a lower end. Preferably, the packing assemblies each comprise a packing body or element surrounded by a protective cage assembly or element. More preferably, the packing assemblies are randomly dumped into the column. A liquid stream is introduced into the upper end of a column and flowed downwardly through the packing in the column. A gas stream is introduced into the lower end of the column and flowed upwardly through the packing in the column for countercurrent contact with the liquid stream. Where the packing element of the packing assembly fits loosely in the cage element and can rotate in the cage element in response to impact by fluid to reduce the pressure drop through the bed, the individual assemblies, will, over time, orient in the column.

DETAILED DESCRIPTION OF THE INVENTION

Figure 1:
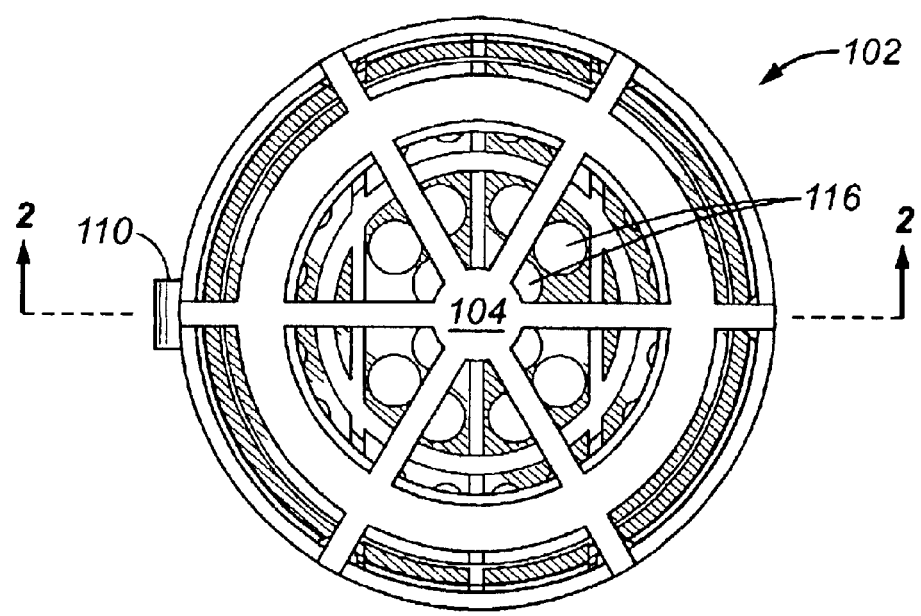
FIG. 1 is an end view of a packing assembly in accordance with an embodiment of the invention.
Figure 2:
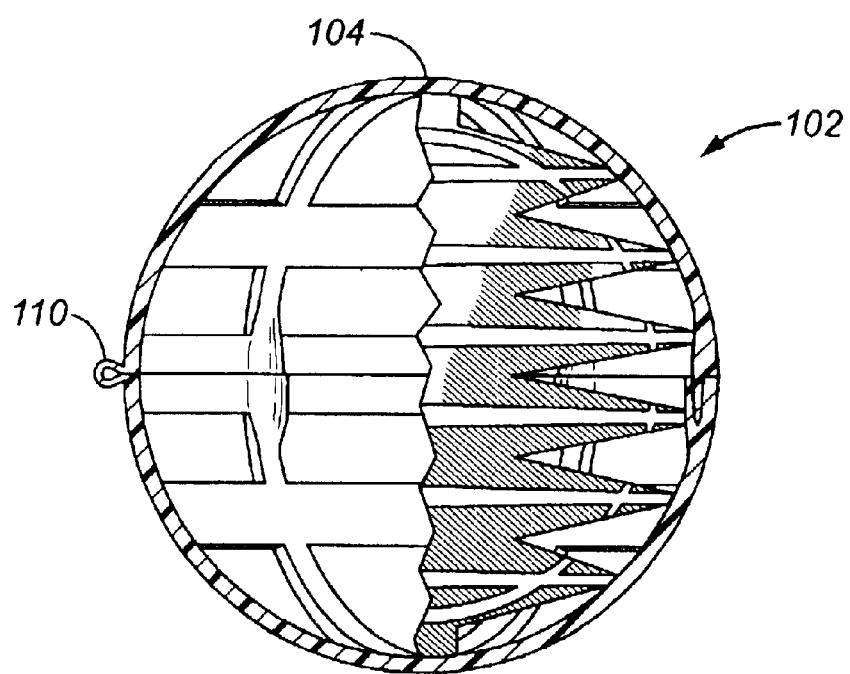
FIG. 2 is a side view of the assembly shown in FIG. 1 in the direction of lines 2—2, with outer portions broken away.
Figure 3:
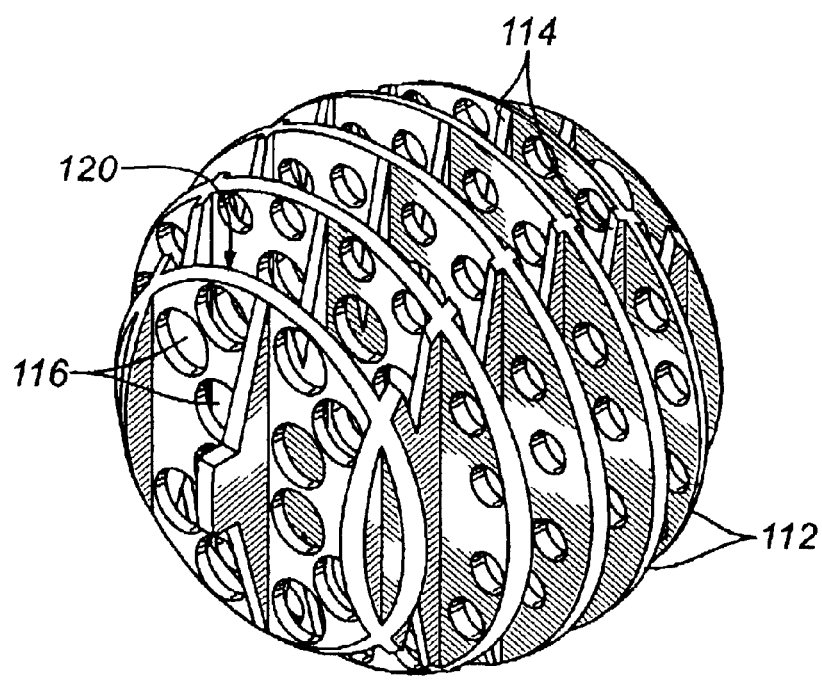
FIG. 3 is a pictorial illustration of an element of the assembly shown in FIG. 1.
Figure 4:
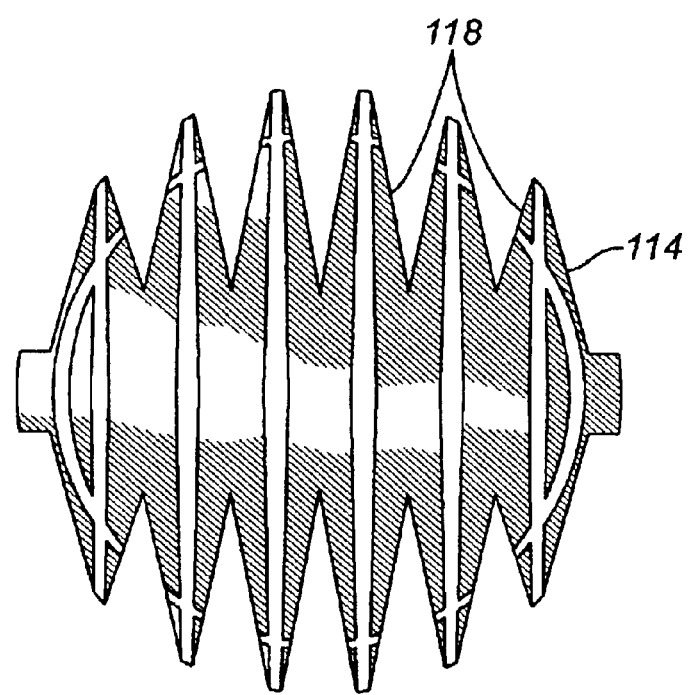
FIG. 4 is a side view of the element shown in FIG. 3.
Figure 5:
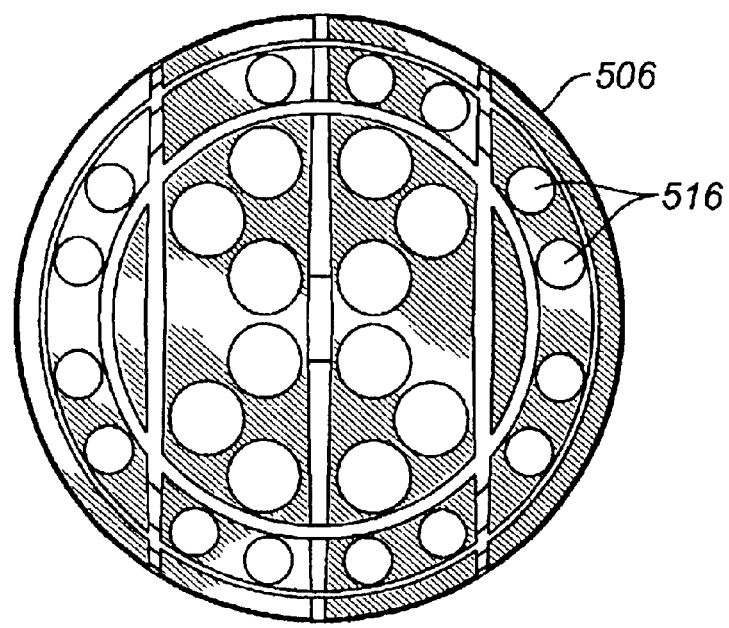
FIG. 5 is an end view of a variation of an element shown in FIG. 3.
Figure 6:
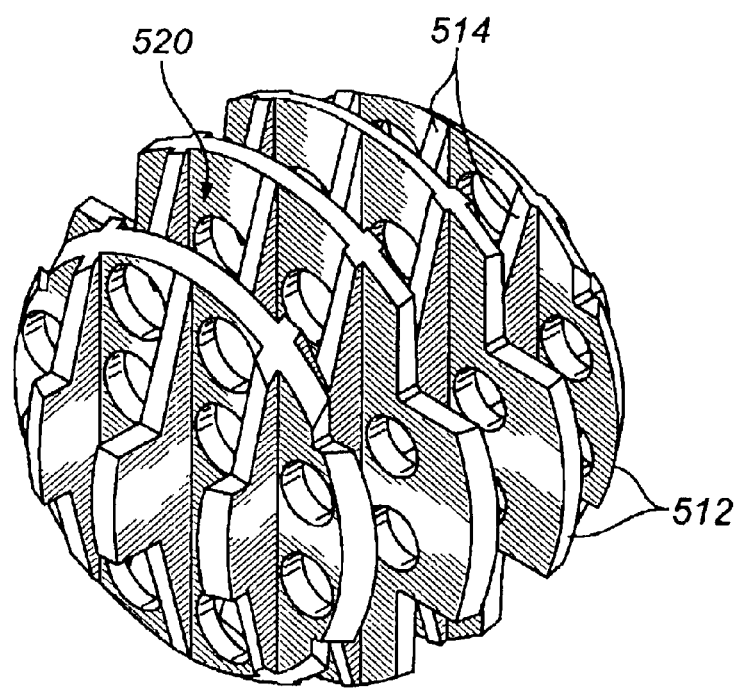
FIG. 6 is a pictorial illustration of the element shown in FIG. 5.
Figure 7:
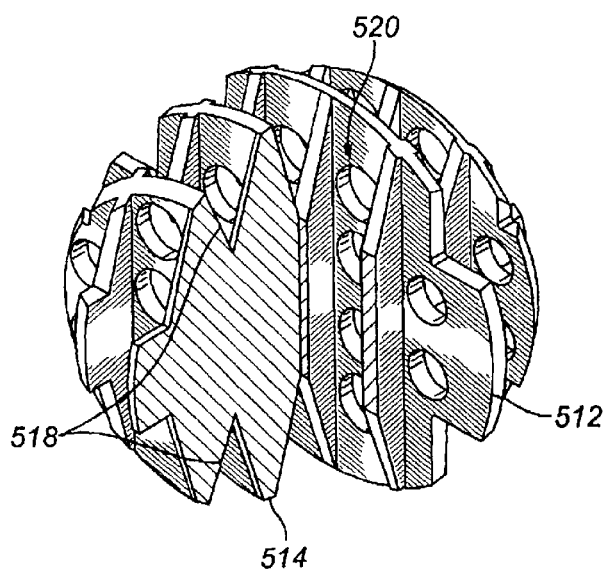
FIG. 7 is a view of the element as in FIG. 6 but with a cut-away portion to show internal geometry.
Figure 8:
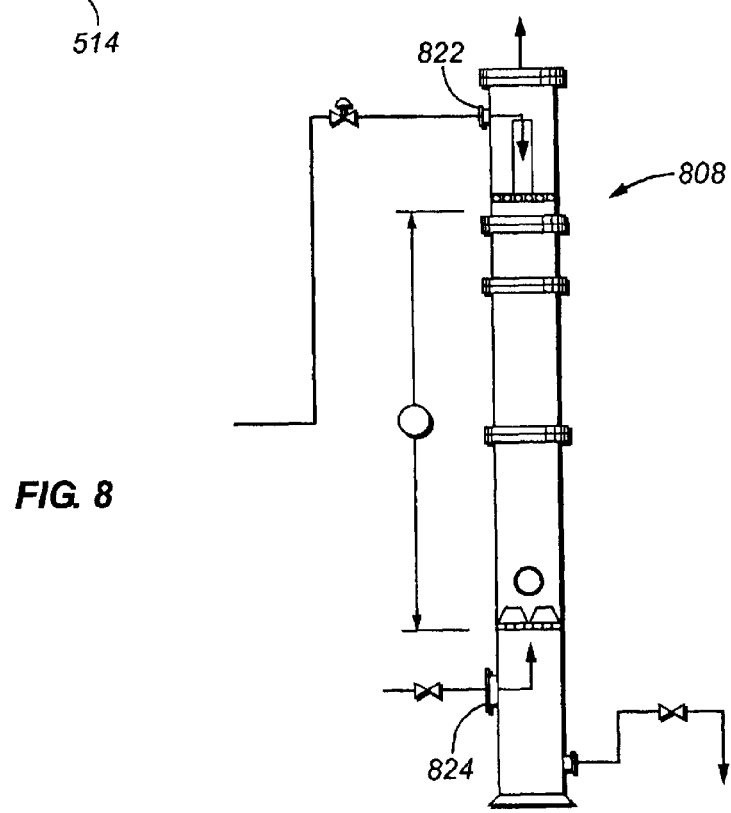
FIG. 8 is an illustration, partly in schematic, of a column system in which the invention can be deployed.

A packing assembly 102 comprises a cage element 104 and a packing element 106, 506. The cage element possesses a crush strength sufficient to withstand crushing forces to be encountered when the packing element is deployed in a column 808. The packing element is positioned in the cage element to provide the packing assembly with more than half of its surface area.

The cage can be made of either or both plastic materials and metals. For example, suitable plastic materials include, but are not limited to, polypropylene (PP), both high density and low density, HDPP and LDPP; polyethylene (PE), both high density, low density, linear high and linear low, HDPE, LDPE, LHDPE, and LLDPE; Polyvinyl Chloride (PVC); Chlorinated polyvinyl chloride (CPVC); Polystyrene (PS); Polycarbonate (PC); Kynar®; Teflon®; Nylon®; and Fiberglass (FRP). Suitable metallic materials include, but are not limited to, the following: stainless steel (all); nickel; monel; cobalt; aluminum; zinc; copper; brass; hastalloy; inconel; and zirconium.

Preferably, the cage element is formed by a mechanical network of structural elements and the packing element is formed of an extruded material. This permits the cage element to be injection molded and also facilitates the provision of a living hinge 18. Preferably, the cage is made with a living hinge for easy opening and closing, plus rigid ribs for support and for strength. Generally speaking, a thermoplastic cage element will have a crush strength in the range of about 10 to about 200 pounds.

Metallic or engineering plastic cages can be made stronger if desired. Good results can be obtained where the cage element is formed from thermoplastic and the cage elements have structural elements positioned along lines of longitude and latitude.

The cage element preferably has an outside configuration and a size which permits it to be dumped randomly and evenly into the column. The cage element can be generally spherical, cylindrical or polyhedral, for example. However, generally spherical is preferred. Preferably, the cage element comprises a pair of generally hemispherical molded cage element halves. Even more preferably, the generally hemispherical cage element halves snap together, because this facilitates assembly of the completed packing assembly. The cage element will generally have an outside diameter in the range of about 0.5 inches to about 12 inches, usually in the range of about 1 inch to about 6 inches.

Where the cage element is formed from a pair of generally hemispherical cage element halves, they are preferably in the form of an upper cage element and a complementary lower cage element. Each cage element has an open mouth which defines a periphery and the upper cage element and the lower cage element are joined in a mouth to mouth relationship by snap fitting elements. Preferably, the snap fitting elements are positioned as pairs of interlocking snap fitting elements along the mouth peripheries of the cage elements, and the upper cage element is further joined to the lower cage element by a hinge to facilitate interlocking the snap fitting elements. The cage element is preferably defined by ribs which provide a low flow resistance through the cage but possess a strength which is sufficient to withstand crushing forces at the bottom of the column when in use.

The packing portion 106, 506 of the packing assembly comprises a first plurality of parallel plates 112, 512 and a second plurality of parallel plates 114, 514. The first plurality of parallel plates have peripheries which enable the plates to be accommodated within a sphere. The second plurality of parallel plates interconnect the first plurality of parallel plates and are positioned normally to the first plurality of parallel plates. The second plurality of parallel plates also have peripheries which enable them be accommodated within the sphere. Generally circular peripheries with cutout notches are preferred.

The packing element can be made of either or both plastics and/or metals. Suitable plastic materials for forming the packing element include, but are not limited to, the following: polypropylene (PP), both high density and low density, HDPP and LDPP; polyethylene (PE), both high density, low density, linear high and linear low, HDPE, LDPE, LHDPE, and LLDPE; Polyvinyl Chloride (PVC); Chlorinated polyvinyl chloride (CPVC); polystyrene (PS); polycarbonate (PC); Kynar®; Teflon®; Nylon®; and fiberglass (FRP). Suitable metal materials include but are not limited to, the following: Stainless steels (all); nickel;

monel; cobalt; aluminum; zinc; copper; brass; hastalloy; inconel; and zirconium, Injection moldable thermoplastics are preferred.

Preferably, each of the first plurality of parallel plates defines apertures 116, 516. More preferably, the apertures are aligned with each other to define aligned, axially-extending passages extending through the plurality of parallel plates.

Also preferably, each of the second plurality of parallel plates defines notches 118, 518 leading inwardly from the periphery of each plate. More preferably, the notches are aligned as between the plates.

The packing element can be considered as having an imaginary longitudinal axis extending normally through the first plurality of parallel plates. The apertures through the first plurality of plates are then preferably aligned circular apertures extending therethrough in a direction parallel to the longitudinal axis. Rectangular passages 120, 520 are defined between adjacent plates of the first plurality and adjacent plates of the second plurality which extend transversely through the packing element. The aligned notches define channels around the edges of the second plurality of plates in a direction orthogonal to the circular apertures and the rectangular passages.

The packing element can have any desired number of plates, but preferably, each of the first plurality of plates and second plurality of plates is between 3 and 10 in number. More preferably, each of the first plurality of plates and second plurality of plates is between 4 and 8 in number.

The area of the apertures, based on the cut-out areas defining the apertures, ranges from about 5 percent to about 50 percent of the area of each of the first plurality of plates, based on the diameter of the plate defining the apertures, and the area of the notches, based on the cut-out areas defining the notches, ranges from about 5 percent to about 50 percent of the area of each of the second plurality of plates, based on the diameter of the plate defining the notches.

The packing and cage elements are preferably deployed together to form a column packing assembly. The cage element is formed to possess a crush strength sufficient to withstand crushing forces to be encountered when the packing element is deployed in a column. The packing element is positioned in the cage element to provide the packing assembly with more than half of its surface area. The individual elements can be as described above, the plates being provided with a periphery which enables the plates to be accommodated within the cage. Preferably, the cage element is generally spherical in shape and is formed by a mechanical network of structural elements, and the packing element is formed of a molded plastic and is of monolithic construction. More preferably, the packing element fits loosely in the cage element and can rotate in the cage element in response to impact by fluid.

For use, a multiplicity of the packing assemblies are positioned inside of a chemical process column having an upper end and a lower end. Each of the packing assemblies comprises a packing body surrounded by a protective cage assembly which can be as described above. Preferably, the protective cage element has a generally spherical outer configuration surface and the packing assemblies are dumped randomly inside of the column.

The column preferably has a liquid inlet 822 positioned near an upper end of the column to introduce a liquid stream into the column which flows downwardly though the packing assemblies and a gas inlet 824 positioned near a lower end of the column to introduce a gas stream into the column which flows upwardly through the packing assemblies and contacts the liquid stream. Performance of the column is improved by providing the packing assemblies with a packing element which fits loosely in the cage element and can rotate in the cage element in response to impact by fluid to reduce the pressure drop through the bed. During the course of operations, the packing elements orient in response to the fluids flowing through the column and perform similarly to structured packings. The individual packing assemblies, however are randomly loaded into the column. To facilitate loading randomly, the protective cage assembly preferably has a near spherical outer surface and an outside diameter in the range of from about 0.01 to about 0.33 times the inside diameter of the column, more preferably an outside diameter in the range of from about 0.03 to about 0.1 times the inside diameter of the column. The invention thus provides a form of structured packing which does not have to be carefully placed in the column, as was the case with prior art structured packings. It is in essence, a structured packing which can be quickly and randomly loaded into the column, as well as dumped out of the column if a turnaround is needed.

The invention further provides a method of effecting gas/liquid contacting in a column. A liquid stream is introduced into the upper end of a column and flowed downwardly through the inventive packing assemblies. The gas steam is introduced into the lower end of the column and flowed upwardly through the packing in the column for countercurrent contact with the liquid stream. The cage elements of the packing have a generally spherical outer configuration and a diameter which is only a small fraction of the diameter of the column, and are provided with sufficient crush resistance to prevent the packing elements from being immobilized by the weight of the packing assemblies and liquid holdup in the column. By providing a cage of adequate strength, and a packing element which fits loosely in the cage, the packings can be rotated in the cages in response to impact by fluid to reduce the pressure drop through the bed.

While certain preferred embodiments of the invention have been described herein, the invention is not to be construed as being so limited, except to the extent that such limitations are found in the claims.

What is claimed is:

1. A packing, assembly for a separation column comprising
    a cage element which possesses a crush strength sufficient to withstand crushing forces to be encountered when the packing assembly is deployed in a column, and
    a packing element positioned in the cage element to provide the packing assembly with more than half of its surface area, wherein the packing element comprises a first plurality of parallel plates, said first plurality of parallel plates having peripheries which enable said plates to be accommodated within the cage element, and
    a second plurality of parallel plates which interconnect the first plurality of parallel plates and are positioned normally to the first plurality of parallel plates, said second plurality of parallel plates having peripheries which enable said second plurality of parallel plates to be accommodated within the cage element,
    wherein the packing element fits loosely in the cage element and can rotate in the cage element in response to impact by fluid.

2. A packing assembly as in claim 1 wherein the cage element is generally spherical in shape and is formed by a mechanical network of structural elements, and the packing element is formed of a molded plastic and is of monolithic construction.

3. A packing assembly as in claim 2 wherein the cage element has an outside diameter in the range of about 0.5 inches to about 12 inches.

4. A packing assembly as in claim 3 wherein the cage element has an outside diameter in the range of about 1 inch to about 6 inches.

5. A packing assembly as in claim 4 wherein the cage element comprises a pair of generally hemispherical molded cage elements.

6. A packing assembly as in claim 5 wherein the generally hemispherical cage elements snap together.

7. A packing assembly as in claim 6 wherein the pair of generally hemispherical cage elements comprises an upper cage element and a complementary lower cage element.

8. A packing assembly as in claim 7 wherein the upper cage element and the lower cage element each has an open mouth which defines a periphery and the upper cage element and the lower cage element are joined in a mouth to mouth relationship by snap fitting elements.

9. A packing assembly as in claim 8 wherein the snap fitting elements are positioned as pairs of interlocking snap fitting elements along the mouth peripheries of the cage elements.

10. A packing assembly as in claim 9 wherein the upper cage element is further joined to the lower cage element by a hinge to facilitate interlocking the snap fitting elements.

11. A packing assembly as in claim 10 wherein the generally hemispherical cage elements have structural elements positioned along lines of longitude and latitude.

12. A packing assembly as in claim 10 wherein the cage element is formed from thermoplastic.

13. A packing assembly as in claim 11 wherein the cage element has a crush strength in the range of about 10 to about 200 pounds.

* * * * *